United States Patent [19]

Meaders

[11] Patent Number: 5,125,457
[45] Date of Patent: Jun. 30, 1992

[54] RESILIENT SEAL FOR CURVED FLAPPER VALVE

[75] Inventor: Michael W. Meaders, Lewisville, Tex.

[73] Assignee: Otis Engineering Corporation, Carrollton, Tex.

[21] Appl. No.: 714,160

[22] Filed: Jun. 11, 1991

[51] Int. Cl.⁵ .............................................. F21B 34/10
[52] U.S. Cl. ................................. 166/322; 137/516.29; 137/527; 166/321; 166/332; 251/63.4; 251/303
[58] Field of Search ............... 166/319, 321, 322, 332; 137/516.29, 527; 251/63.4, 298, 303

[56] References Cited

U.S. PATENT DOCUMENTS

| | | | |
|---|---|---|---|
| 2,556,904 | 6/1951 | Cline et al. | 137/527 X |
| 3,327,991 | 6/1967 | Wallace | 251/332 X |
| 4,457,376 | 7/1984 | Carmody et al. | 251/298 X |
| 4,531,587 | 7/1985 | Fineberg | 137/527 X |
| 4,583,596 | 4/1986 | Davis | 137/516.27 X |
| 4,674,575 | 6/1987 | Guess | 137/516.29 X |
| 4,951,753 | 8/1990 | Eriksen | 166/332 X |

*Primary Examiner*—Gerald A. Michalsky
*Attorney, Agent, or Firm*—Dennis T. Griggs

[57] ABSTRACT

A subsurface safety valve has a resilient valve seat and an upwardly closing flapper plate whose sealing surfaces each have a match spherical radius of curvature. The sealing surface of the valve seat is a concave spherical segment of elastomer material and the sealing surface of the flapper plate is a convex spherical segment. The matching spherical surfaces are lapped together to provide a metal-to-metal seal along the interface between the nested convex and concave sealing surfaces. This permits angular displacement of the flapper plate relative to the valve seat without interrupting positive sealing engagement. The concave spherical seating surface of the resilient valve seat will tolerate a limited amount of misalignment of the flapper plate which may be caused by operation in low differential pressure, sandy well conditions.

25 Claims, 9 Drawing Sheets

FIG. 16 VALVE OPEN    FIG. 17

FIG. 18 VALVE CLOSED   FIG. 19

RESILIENT SEAL FOR CURVED FLAPPER VALVE

FIELD OF THE INVENTION

This invention is related generally to safety valves, and in particular to a subsurface safety valve which includes a flapper closure plate and resilient seal for controlling fluid flow through a production tubing string.

BACKGROUND OF THE INVENTION

Surface controlled, subsurface safety valves are commonly used to shut in oil and gas wells should a failure or hazardous condition occur at the well surface. Such safety valves are typically fitted into the production tubing and operate to block the flow of formation fluid upwardly through the production tubing. The subsurface safety valve provides automatic shutoff of production flow in response to one or more well safety conditions that can be sensed and/or indicated at the surface, for example a fire on the platform, high/low flow line pressure condition, high/low flow line temperature condition, and operator override. During production, the subsurface safety valve is held open by the application of hydraulic fluid pressure conducted to the subsurface safety valve through an auxiliary control conduit which is extended along the tubing string within the annulus between the tubing and the well casing.

DESCRIPTION OF THE PRIOR ART

Flapper safety valves utilize a closure plate which is actuated by longitudinal movement of a hydraulically actuated, tubular piston. The flapper valve closure plate is maintained in the valve open position by an operator tube which is extended by the application of hydraulic pressure to the piston. A pump at the surface pressurizes a reservoir which delivers regulated hydraulic control pressure through a control conduit. Hydraulic fluid is pumped into a variable volume pressure chamber and acts against the crown of the piston. When the production fluid pressures rises above or falls below a preset level, the control pressure is relieved, and the piston and operator tube are retracted to the valve closed position by a return spring. The flapper plate is then rotated to the valve closed position by a torsion spring and in response to the differential pressure exerted by downhole formation fluid.

In some wells, such as gas wells, a high fluid flow rate of as much as 20 million cubic feet or more per day may be conducted through the production bore of the safety valve. As the tubular piston and operator tube retract, the flapper closure plate drags across the lower end of the operator tube and throttles the flow as it rotates toward the closed, seated position. A high differential pressure may be developed across the flapper closure plate which may cause distortion and warping of the flapper plate as it rubs against the operator tube. Also, the flapper closure plate may be damaged if it is slammed open against the valve housing or slammed shut against the valve seat in response to the high pressure differential.

In conventional subsurface safety valves of the type utilizing an upwardly closing flapper plate, the flapper plate is seated against an annular sealing face, either in metal-to-metal contact, or metal against an annular elastomeric seal. In some arrangements, for example as shown in U.S. Pat. No. 3,955,623, the flapper closure plate has a flat, annular sealing face which is engagable against a flat, annular valve seat ring, with sealing engagement being enhanced by an elastomeric seal ring which is mounted on the valve seat. In other arrangements, for example as shown in U.S. Pat. No. 4,457,376, the valve seat includes a downwardly facing, conical segment having a sloping sealing surface, and the flapper closure plate has a complementary, sloping annular sealing surface which is adapted for surface-to-surface engagement against the conical valve seat surface.

The flapper closure plate is supported for rotational movement by a hinge assembly which includes a hinge pin and a torsion spring. It will be appreciated that structural distortion of the flapper valve closure plate, or damage to the hinge assembly which supports the flapper closure plate for rotational movement into engagement with the valve seat, can cause misalignment of the respective sealing surfaces, thereby producing a leakage path through the safety valve.

Misalignment of the flapper closure plate relative to the valve seat may also be caused by the deposit of sand particles on the valve seat and/or sealing surfaces of the flapper closure plate. Sand may be produced in gas wells and oil wells, under low flow rate conditions as well as high flow rate conditions. It has been particularly difficult to obtain positive sealing engagement of conventional flapper closure plates and valve seats in low pressure, sandy environments.

The integrity of sealing engagement between the flapper plate and valve seat may be compromised under low flow rate conditions, while the same safety valve may provide positive closure and sealing engagement under high flow rate, high differential pressure conditions. That is, slight misalignment may be overcome by high pressure impact and engagement of the flapper closure plate against the valve seat. However, the same misalignment may produce a leakage path under low differential pressure conditions.

Such misalignment will prevent correct seating and sealing of the flapper plate, and a large amount of formation fluid may escape through the damaged valve, causing waste and pollution. During situations involving damage to the wellhead, the well flow must be shut off completely before repairs can be made and production resumed. Even a small leak through the flapper safety valve in a gas well can cause catastrophic damage.

Representative subsurface safety valves having an upwardly closing flapper plate are disclosed in the following U.S. patents:

| | | | |
|---|---|---|---|
| 3,865,141 | 3,955,623 | 4,077,473 | 4,160,484 |
| 4,161,960 | 4,376,464 | 4,449,587 | 4,457,376 |
| 4,531,587 | 4,583,596 | 4,605,070 | 4,674,575 |
| 4,890,674 | 4,983,830 | 4,986,358 | |

OBJECTS OF THE INVENTION

A general object of the invention is to provide an improved subsurface safety valve having a flapper plate and yieldable valve seat for automatically shutting in a well below the earth's surface in the event of damage to the wellhead, flow line or malfunction of surface equipment, with shut-in being accomplished safely and effectively under low flow rate as well as high flow rate conditions.

A related object of the invention is to provide an improved surface-controlled, subsurface safety valve having a yieldable valve seat which is adapted to provide a positive seal against a flapper closure plate to overcome distortion and/or misalignment of its sealing surface relative to the safety valve seat.

Another object of the invention is to provide an improved surface-controlled, subsurface flapper safety valve in which the flapper closure plate and safety valve seat are tolerant to surface distortions caused by sand deposits or erosion of their respective sealing surfaces which may be caused by operation under sandy well conditions.

SUMMARY OF THE INVENTION

The foregoing objects are achieved by the present invention in an improved subsurface safety valve assembly having a valve seat made of a yieldable material such as elastomer (nitrile rubber), thermoplastic polymer (TEFLON ®), or a soft metal (lead, copper, zinc and brass), and an upwardly closing flapper plate whose sealing surfaces each have a matched spherical radius of curvature. That is, the valve seat is a concave spherical segment of yieldable or resilient material, and the sealing surface of the flapper plate is a convex spherical segment. As used herein, "spherical segment" means and refers to a portion of a spherical surface lying between two planes. In this arrangement, the spherical radius of curvature of the yieldable valve seat segment is matched with the spherical radius of curvature of the convex spherical segment which defines the sealing surface on the flapper plate. The mating spherical surfaces are matched together to provide a positive seal along a continuous interface band between the nested convex and concave spherical sealing surfaces.

According to the foregoing arrangement, the convex spherical sealing segment of the flapper plate is received in nesting engagement against the concave spherical segment surface of the yieldable valve seat, thereby allowing some angular displacement of the flapper plate relative to the valve seat without interrupting surface-to-surface engagement therebetween. That is, the concave spherical seating surface of the yieldable valve seat will tolerate a limited amount of angular misalignment of the flapper plate which might be caused by structural distortion of the closure plate or warping of the hinge assembly. Distortion of the flapper plate in pitch or yaw caused by slamming impact of the flapper plate, or scraping engagement of the flapper plate against the operator tube during closing movement, will not interrupt the seal but will only cause a limited reduction of the spherical sealing area interface between the flapper plate and valve seat.

Moreover, because nesting engagement between convex and concave spherical surfaces is provided, the flapper plate sealing surface will positively engage the yieldable, convex spherical segment valve seat in a continuous sealing interface band, thereby preserving the integrity of the seal even if some misalignment should occur.

Positive sealing engagement between the flapper plate and the convex spherical segment in a continuous, spherical band interface region is obtained in sandy environments by engagement of the yieldable seat which conforms about surface irregularities which may be caused by surface deposits or surface erosion caused by the production of sand fines. Moreover, because of the large surface area of engagement between the overlapping spherical segment surfaces, a positive seal is obtained under low differential pressure conditions.

In contrast, misalignment of conventional planar sealing surfaces or conical sealing surfaces produces engagement of the flapper plate along one or more separated line segments on the seat, thereby exposing the bore of the valve seat and producing a leakage path through the valve. It will be appreciated that the foregoing convex-to-concave yieldable seating arrangement of the present invention is tolerant of a limited amount of angular misalignment of the flapper plate, and provides a positive seal in spite of surface distortions caused by sand fines in sandy environments, and under low differential pressure conditions as well as high differential pressure conditions.

The novel features of the invention are set forth with particularity in the claims. The invention will best be understood from the following description when read in conjunction with the accompanying drawings, wherein:

DETAILED DESCRIPTION OF THE PREFERRED EMBODIMENTS

In the description which follows, like parts are marked throughout the specification and drawings with the same reference numerals, respectively. The drawings are not necessarily to scale and the proportions of certain parts have been exaggerated to better illustrate details and features of the invention. As used herein, the designation S refers to internal and external O-ring seals and the designation T refers to a threaded union.

WIRE LINE RETRIEVABLE EMBODIMENT

Figures 1, 2, 3:
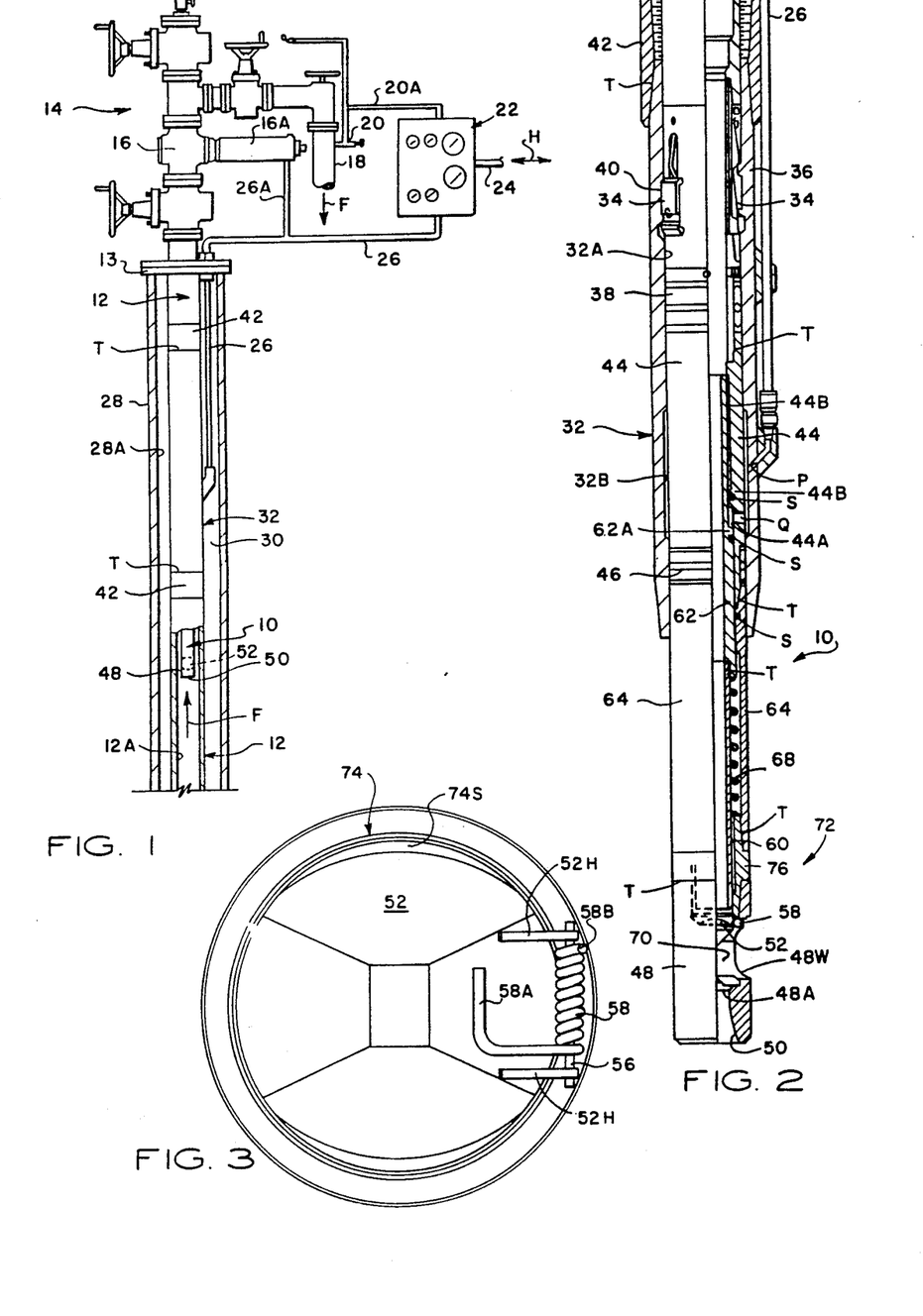
FIG. 1 is an elevation view, partly in section, of a typical production well having a surface controlled, wire line retrievable subsurface safety valve constructed according to the present invention.
FIG. 2 is an elevation view, partly in section, of the wire line retrievable subsurface safety valve shown in FIG. 1, together with its control apparatus and production tubing.
FIG. 3 is a bottom plan view of the inlet end of the safety valve with the flapper closure plate in the valve closed position.

Apparatus constructed according to the preferred embodiment of the present invention in the form of a surface controllable subsurface safety valve 10 is shown generally in FIG. 1. In FIG. 1, the subsurface safety valve 10 is a well safety valve of the wire line retrievable type which is positioned within the bore of a production tubing string 12. The production tubing string 12 is suspended from a tubing hanger assembly 13, which forms a part of a well head assembly 14.

The wellhead assembly 14 includes a hydraulically actuated, reverse-acting surface safety valve 16 which is connected in series flow relation with a production flow line 18. Flow line pressure conditions are sensed by a monitor pilot 20. A hydraulic pressure signal 20A produced by the pilot 20 is input to a hydraulic controller 22 which controls the flow of hydraulic fluid H through a supply conduit 24 which is connected to a hydraulic pump and reservoir (not illustrated). According to this arrangement, flow line pressure conditions are sensed by the pilot 20, and the controller 22 directs pressurized hydraulic fluid through a control conduit 26. The control conduit 26 provides pressurized hydraulic control fluid to the hydraulic actuator 16A of the gate valve 16, and also provides pressurized hydraulic control fluid to the subsurface control valve 10.

The production tubing 12 is suspended from the tubing hanger assembly 13 within a tubular well casing 28. The control conduit 26 is routed along the production tubing 12 in the annulus 30 between the bore 28A of the well casing and the production tubing string 12.

Referring now to FIG. 2, the surface controllable safety valve 10 is retrievably positioned within the bore of a landing nipple 32 by retractable locking dogs 34 which are mounted on a lock mandrel 36. The annulus between the safety valve 10 and the landing nipple bore 32A is sealed by a V pack seal assembly 38.

The lock mandrel 36 and the safety valve 10 are locked and sealed against the landing nipple 32. The locking dogs are received in detented engagement within an annular slot 40 formed within the inside diameter bore 32A of the landing nipple, with the annulus between the landing nipple bore and the lock mandrel 36 being sealed by the seal assembly 38. The landing nipple 32 is coupled to the production tubing string 12 by a threaded coupling collar 42. The upper end of the subsurface safety valve assembly 10 includes a connector sub 44 which is joined to the lock mandrel 36 by a threaded union T. The annulus between the landing nipple bore 32B and the connector sub 44 is sealed by V pack seal assemblies 38, 46.

The lower end of the subsurface safety valve 10 includes a flapper housing sub 48 within which the streamlined flapper closure plate and valve seat of the present invention are installed. The flapper housing sub 48 has an inlet port 50 which admits formation fluid F into the production tubing bore 12A for conduction through the safety valve 10 to the wellhead assembly 14 where it is discharged through flow line 18 as shown in FIG. 1. The flapper housing sub 48 also has a window opening 48W which receives the back side of a flapper plate 52 as described below.

Figure 4:
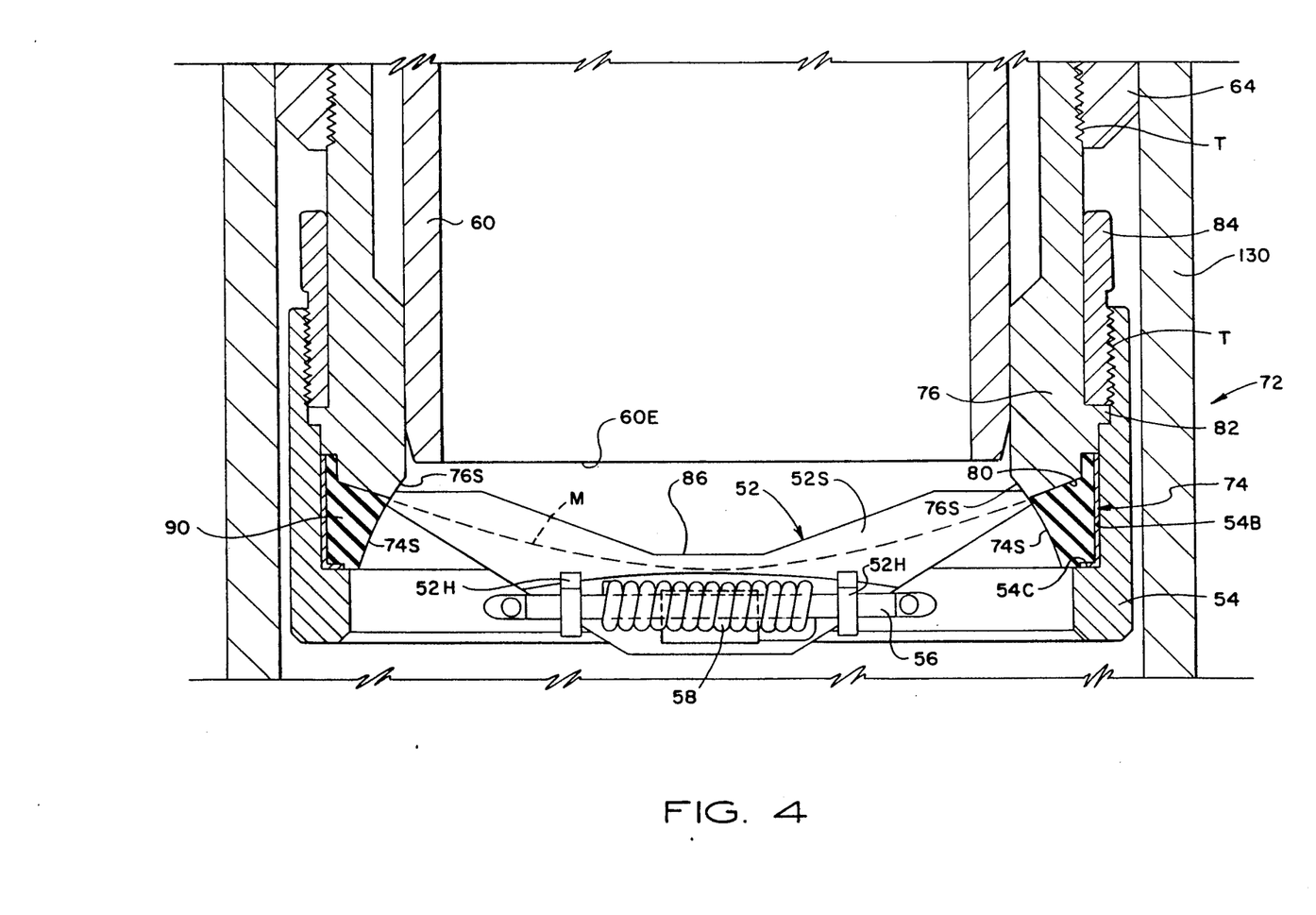
FIG. 4 is an enlarged longitudinal view in full section and partly broken away, which illustrates details of the flapper closure plate and resilient valve seat of the present invention.
Figure 4A:
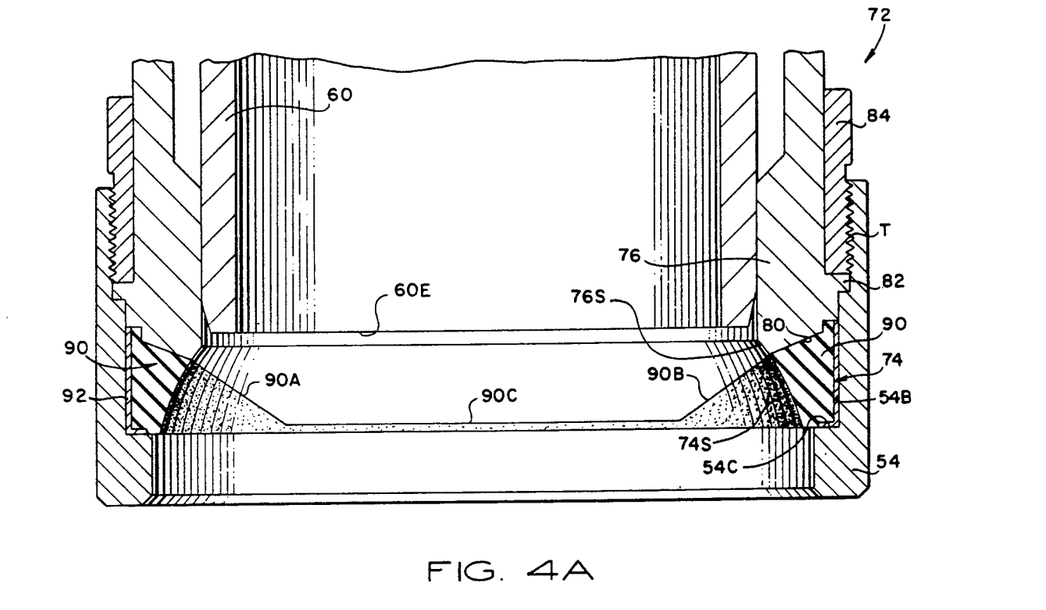
FIG. 4A is a view similar to FIG. 4 with the flapper closure plate and coil spring removed.
Figure 5:
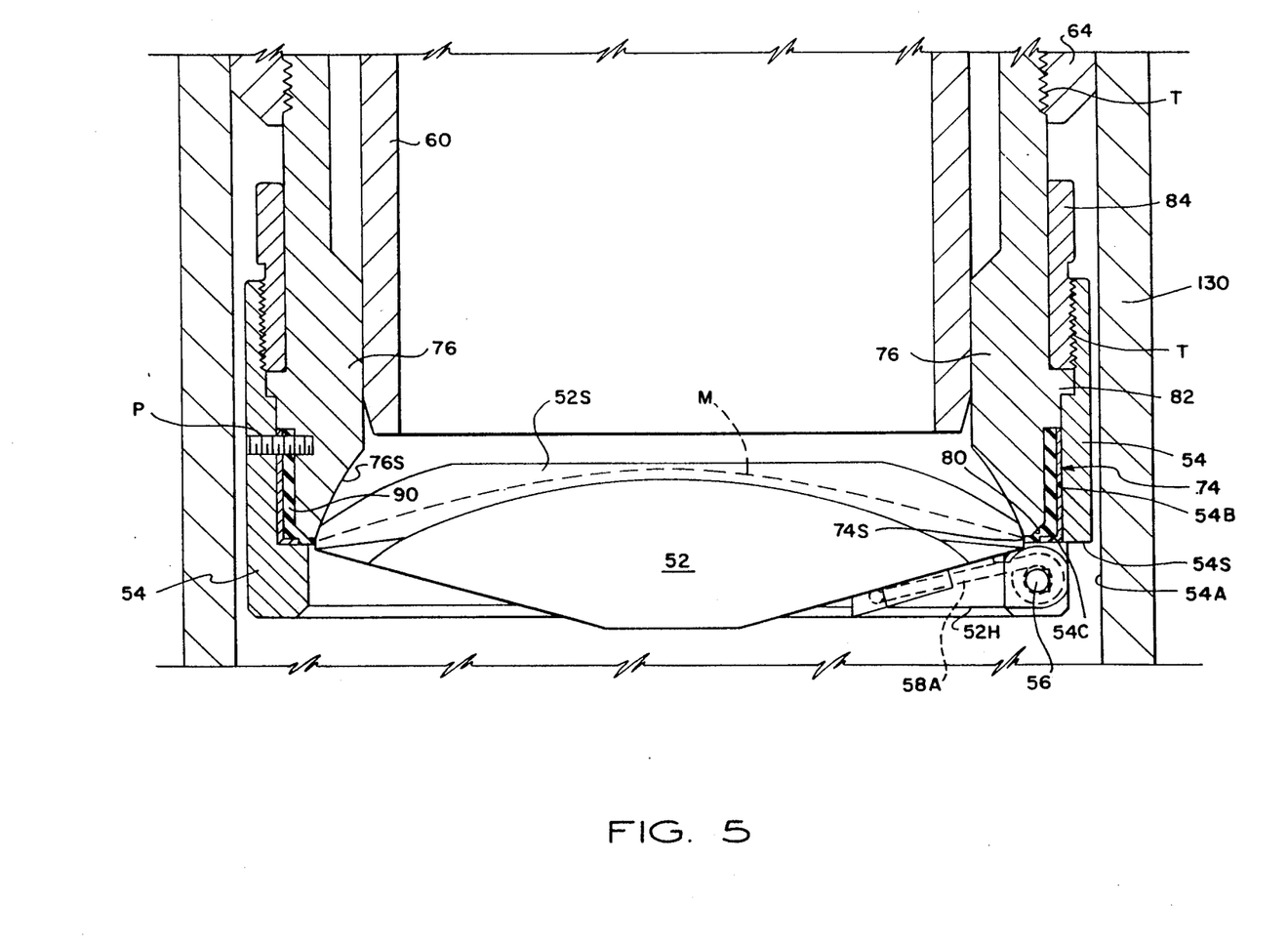
FIG. 5 is an enlarged longitudinal view in full section and partly broken away, which illustrates details of the flapper closure plate and resilient valve seat of the present invention, taken along a plane which is rotated by 90 degrees with respect to the view shown in FIG. 4.
Figure 5A:
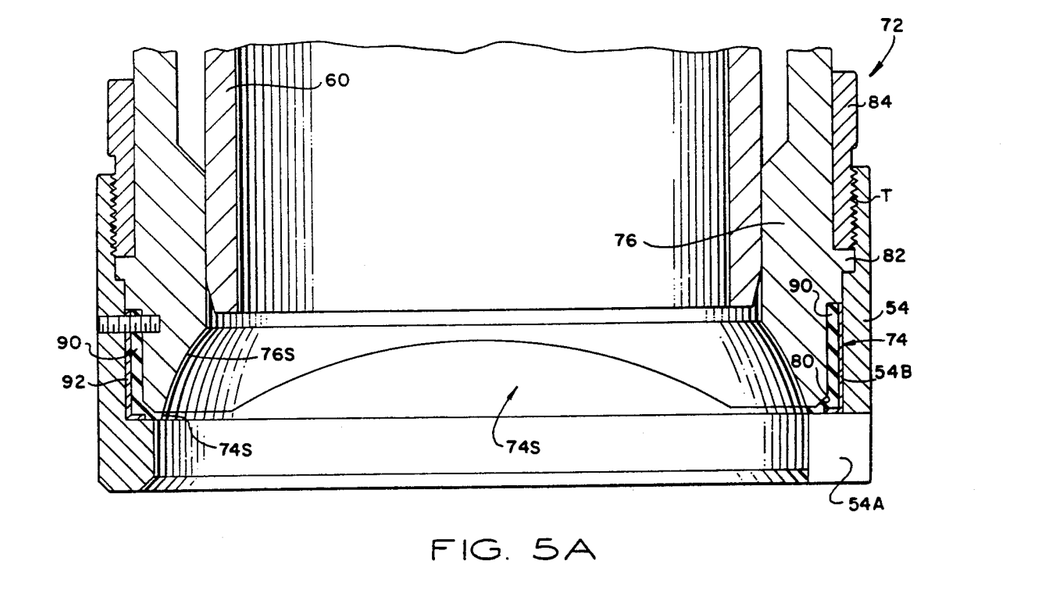
FIG. 5A is a view similar to FIG. 5 with the flapper closure plate and coil spring removed.
Figures 13, 14, 15:
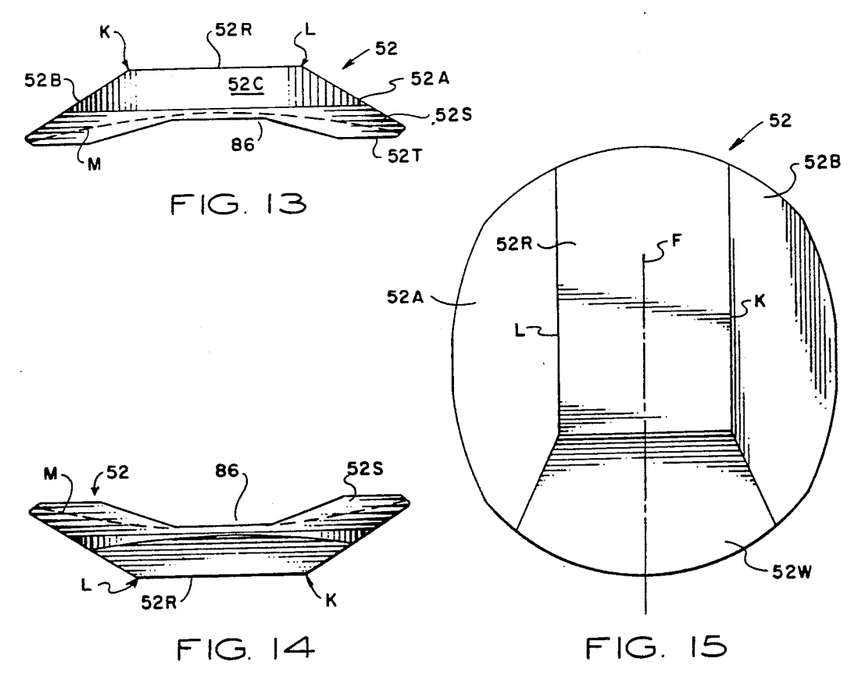
FIG. 13 is a rear elevational view thereof.
FIG. 14 is a front elevational view thereof.
FIG. 15 is a bottom plan view thereof.

Referring to FIG. 3, FIG. 4 and FIG. 5, the valve closure member of the safety valve 10 is a flapper plate 52 which is pivotally coupled to a hinge sub 54 by a pivot pin 56. The flapper plate 52 is in the form of a semi-cylindrical segment having a longitudinal axis F (FIG. 15). The flapper plate 52 is biased for rotational movement to the valve closed position (FIG. 2) by a coil spring 58 (FIG. 3). In the valve open position shown in FIG. 17, the spring bias is overcome and the flapper plate 52 is retained in the valve open position to permit formation fluid flow upwardly through the production tubing string bore to the wellhead assembly 14. The flapper plate 52 is retained in the valve open position by a thin-walled cylindrical operator tube 60.

The operator tube 60 is connected by a union T to a tubular piston 62. The operator tube 60 and piston 62 are enclosed within a cylindrical spring housing 64 which is joined at its lower end to a valve seat sub 66 by a threaded union T, and which is joined at its upper end to the connector sub 44 by a threaded union T.

Figures 16, 17:
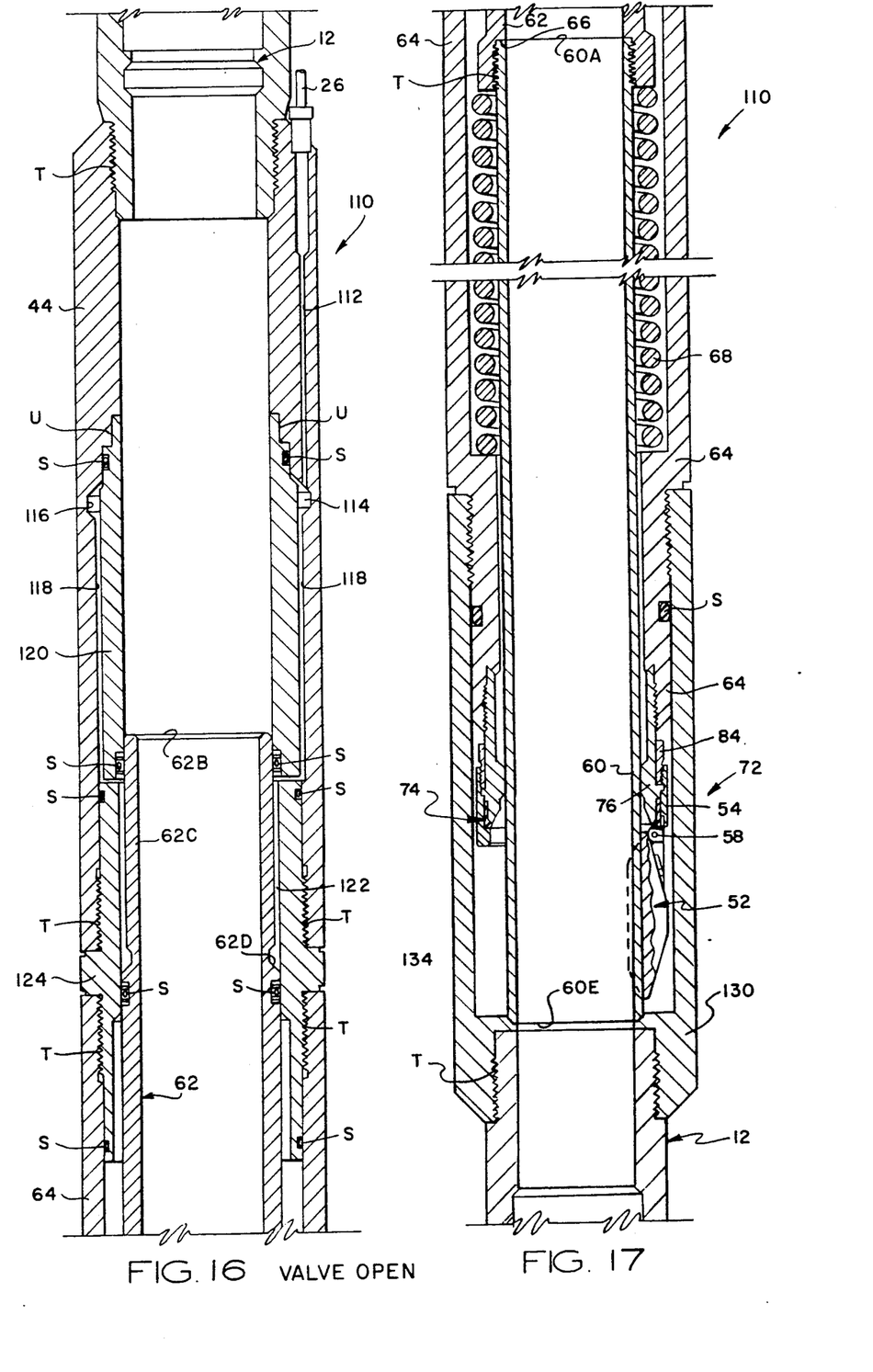
FIG. 16 and FIG. 17 are longitudinal views in section of a surface controlled, tubing retrievable subsurface safety valve constructed according to the present invention, showing the relative position of its component parts in the valve open position; and, FIG. 18 and FIG. 19 are longitudinal views in section of the tubing retrievable subsurface safety valve of FIGS. 16, 17 showing the various components of the safety valve in the valve closed position.
Figure 18:
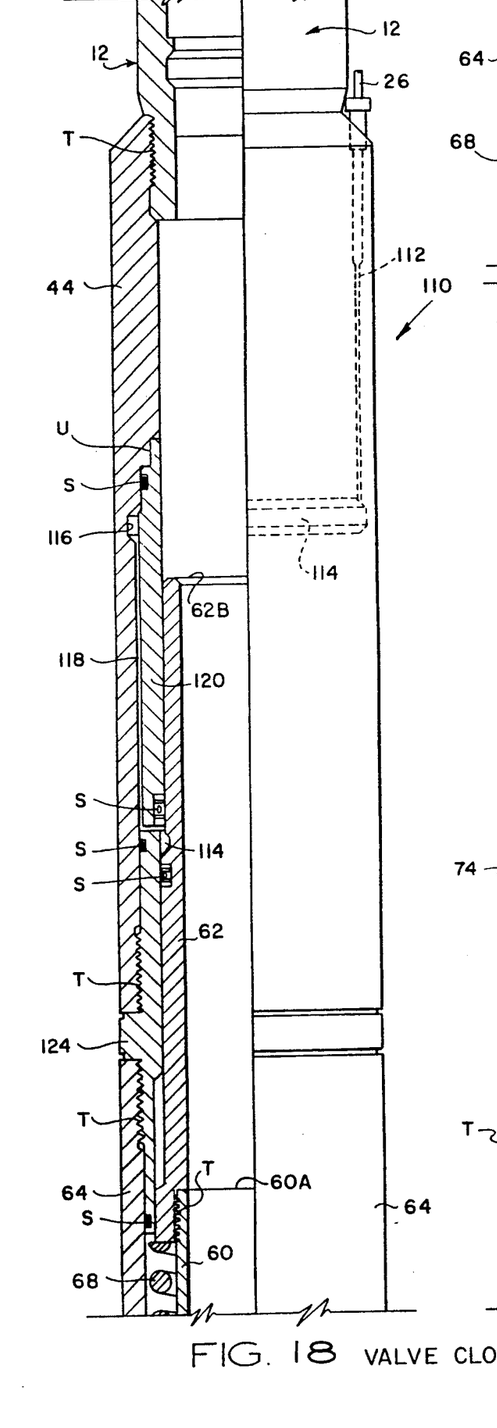
Figure 19:
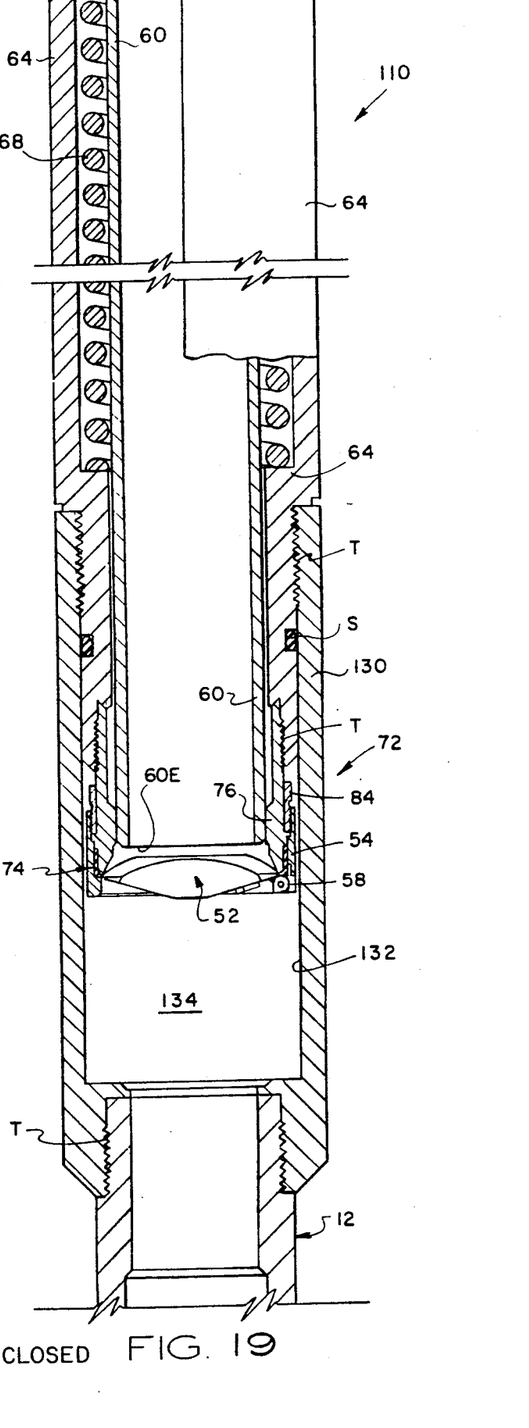

Pressurized hydraulic fluid H is delivered through the control conduit 26 into an inlet port P (FIG. 2) formed in the sidewall of the landing nipple 32. An undercut annulus 32B between the connector sub 44 and the landing nipple bore 32A is filled with pressurized hydraulic fluid H. The pressurized hydraulic fluid H is discharged through one or more radial flow ports Q formed in the connector sub 44 into an undercut annulus 44A formed between the tubular piston 62 and the inside diameter bore of the connector sub 44. The pressurized hydraulic fluid H is confined within the undercut annulus 44A by an internally mounted O-ring seal S mounted on the inside diameter bore of the connector sub 44, and by an external O-ring seal S mounted on the external surface of the tubular piston 62. As the annulus 44A becomes pressurized with hydraulic fluid, the tubular piston 62 is driven downwardly through the spring housing 64, thus extending the operator tube 60 to the valve open position as shown in FIG. 17.

Referring again to FIG. 2, the operator tube 60 and the piston 62 are radially confined within the cylindrical spring housing 64. The piston 62 is adapted for slidable, sealing engagement against the inside diameter bore of the connector sub 44 and is disposed in slidable, sealing engagement against the O-ring seal S which is mounted on connector sub shoulder 44B. Likewise, an external O-ring seal S mounted on a radially stepped piston shoulder portion 62A bears in sealing engagement against the inside diameter bore of the connector sub shoulder 44B. As the annulus 44A is pressurized with hydraulic fluid H which enters the radial flow port Q, the piston 62 and operator tube 60 are driven downwardly. Continued extension of the piston 62 drives the operator tube 60 into the valve open, open bore position as shown in FIG. 17.

The flapper plate 52 is held in the valve open, clear passage position as the operator tube 60 is forced downwardly into engagement against a radially stepped shoulder 48A of the flapper housing sub 48. Hydraulic control pressure is maintained by the controller 22 until some unusual flow line condition is sensed, or in response to an operator override command. In response to such a condition or command, hydraulic pressure is relieved from the annular piston pressure chamber 44A, with hydraulic fluid being returned to the surface reservoir in reverse flow through the control conduit 26 and supply conduit 24 as the piston 62 is retracted upwardly by a return spring 68.

As the piston 62 is retracted by the return spring 68, the operator tube 60 is retracted longitudinally through the flapper valve chamber 70. The flapper closure plate 52 will begin rotation through the chamber 70 toward a valve seat assembly 72 and will drag against the circular edge 60E of the operator tube, with the circular edge 60E presenting a fulcrum surface on which reaction forces are concentrated. As the flapper closure plate 52 nears an angular position within the flapper valve chamber 70 where significant throttling of fluid flow occurs, the high magnitude reaction forces may distort the operator tube 60, the flapper closure plate 52 or the pivot pin 56. Moreover the alignment of the flapper plate 52 relative to the valve seat assembly 72 may be disturbed in response to slamming impact of the flapper closure plate against the valve seat insert 74.

Referring again to FIGS. 3, 4 and 5, the flapper plate 52 has hinge plates 52H which are coupled to the hinge sub 54 by the hinge pin 56. The flapper hinge plates 52H are received within a radial slot 54A which is formed along the lower end of the flapper hinge sub 54. Each flapper hinge 52H is provided with a bore through which the hinge pin 56 extends. The end portions of the hinge pin 56 are received within a slot which intersects the hinge sub 54. The coil spring 58 includes a lever arm 58A engaging the underside of the flapper plate 52, and an anchor arm 58B which engages the hinge sub 54 for reacting the spring force which is produced upon rotation of the flapper plate 52 counterclockwise away from its seated position (valve closed) as shown in FIG. 4.

By this arrangement, the flapper hinge and coil spring are confined axially by the shoulder 54S of the hinge sub 54, and are confined against radial movement by the hinge pin 56. The hinge pin 56, flapper hinge 72 and the radial slot 54S are machined according to close tolerances to provide smooth pivoting movement of the flapper plate 52.

The valve seat insert 74 is confined radially within a counterbore cavity 54B formed in the hinge sub 54. The valve seat insert 74 is confined axially between a radial shoulder 54C of the hinge sub 54 and a threaded primary valve seat 76. The valve seat insert 74 is abutted against the radially stepped shoulder 80 which is formed on the lower end of the primary valve seat 76. The primary valve seat 76 has an annular rib 82 which is confined between the hinge sub 54 and a threaded collar 84. The upper end of the primary valve seat 76 is connected by a threaded union T to the lower end of the spring housing.

Figure 8:
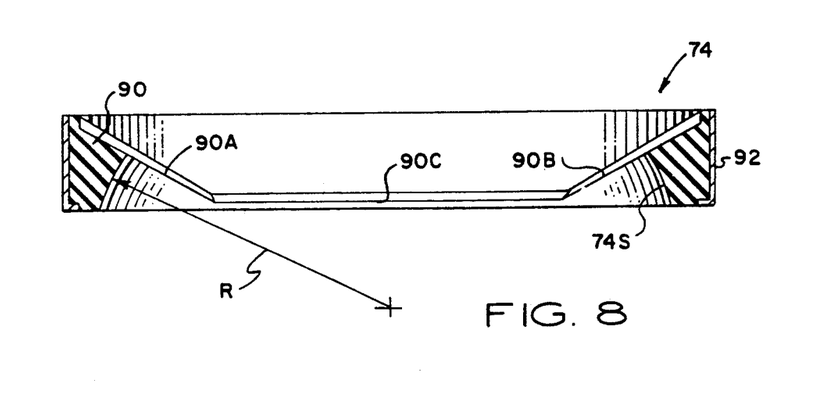
FIG. 8 is a sectional view of the valve seat insert assembly shown in FIG. 7, taken along the line 8—8.
Figure 9:
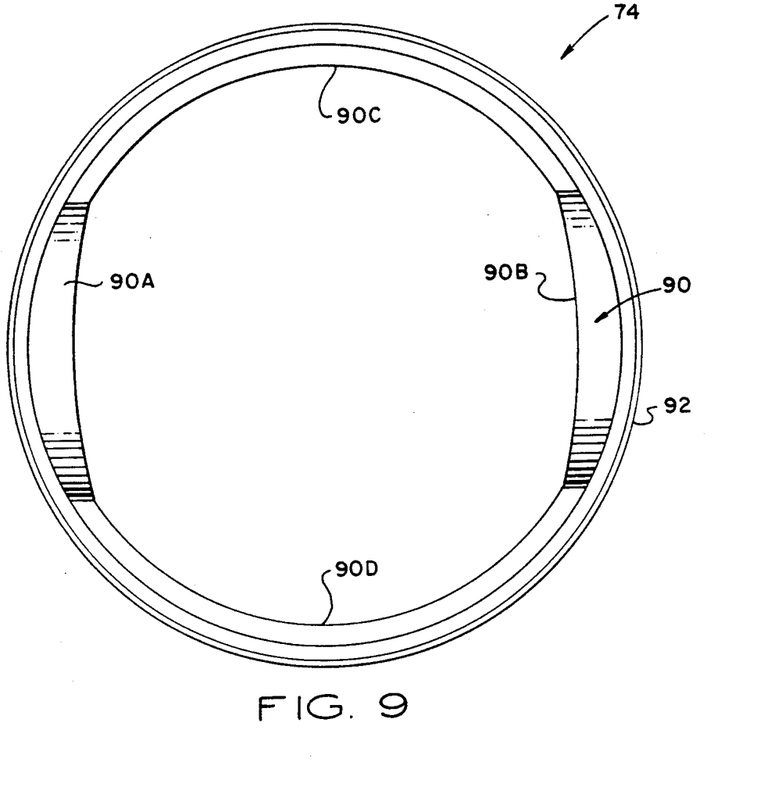
FIG. 9 is a top plan view of the valve seat insert assembly shown in FIG. 7.
Figure 10:
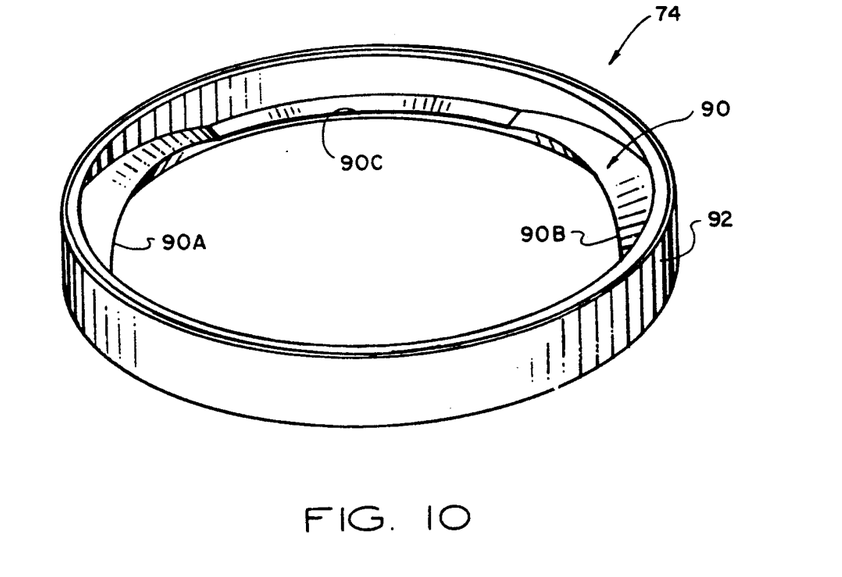
FIG. 10 is a top perspective view thereof.
Figure 11:
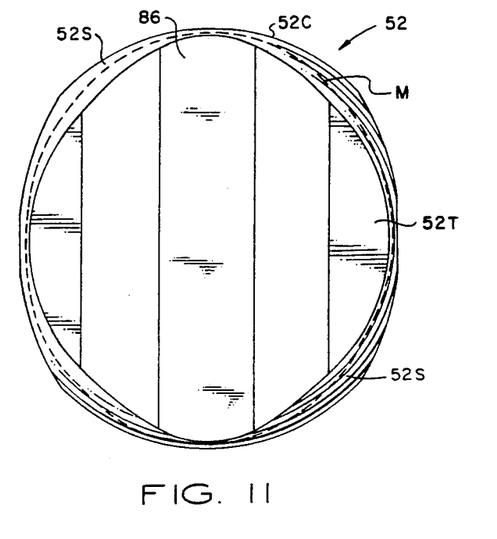
FIG. 11 is a top plan view of the flapper closure plate of FIG. 2.
Figure 12:
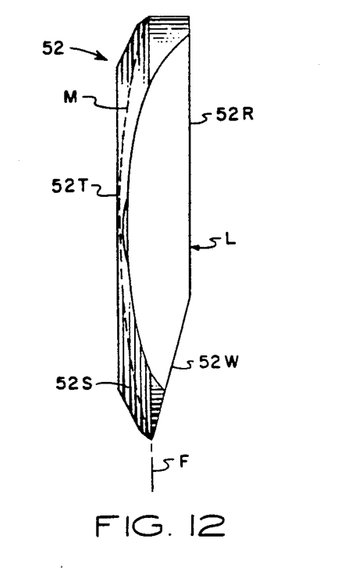
FIG. 12 is a left side elevational view thereof.

According to an important feature of the invention, the sealing surfaces of the flapper plate 52, the valve seat insert 74 and the primary valve seat 76 are spherical segment surfaces 52S, 74S and 76S which are matched together to provide nesting engagement in the valve closed position. The sealing surface of the auxiliary seat insert 74 is a concave spherical segment 74S and the sealing surface of the primary valve seat is a concave spherical segment 76S. The sealing surface of the flapper plate 52 is a convex spherical segment 52S. The midpoint of the convex spherical sealing segment surface 52S is indicated by the dashed line M (FIG. 4). The convex sealing surface 52S and the concave valve seat sealing surfaces 74S, 76S are generally surfaces of revolution produced by revolving a semi-circular arc having a radius of curvature R (FIG. 8). As shown in FIG. 4, the radius of curvature of the flapper plate convex sealing surface 52S is substantially equal to the radius of curvature of the concave auxiliary valve seat spherical segment surface 74S and primary valve seat surface 76S.

That is, the spherical radius of curvature of the concave valve seat spherical segment 74S and the primary valve seat surface 76S are matched with the spherical radius of curvature of the convex spherical segment 52S which defines the sealing surface of the flapper plate 52. As used herein, "matched radius of curvature" means that the radius of curvature of the flapper plate convex spherical segment is substantially the same as, but not greater than, the radius of curvature of the primary and auxiliary valve seat concave spherical segments. Preferably, the convex and concave surfaces are matched together to permit smooth, non-binding rotational engagement of the flapper plate convex sealing surface 52S against the auxiliary valve seat concave surface 74S and the primary valve seat concave surface 76S.

The matching convex and concave spherical surfaces 52S, 74S and 76S are matched together to permit close nesting engagement of the flapper plate within the concave sealing cavity of the valve seat insert 74 and primary valve seat 76. This arrangement permits smooth angular displacement of the flapper plate 52 relative to the valve seat surfaces 74S, 76S without interrupting surface-to-surface engagement of the spherical segment surfaces therebetween. That is, distortion of the flapper plate in pitch or yaw caused by scraping engagement of the flapper plate against the operator tube 60 during closing movement, or by slamming impact of the flapper plate against the flapper housing sub 48 during opening movement, will not interrupt surface-to-surface engagement between the nested spherical segments, but will merely shift the region of overlapping engagement and slightly reduce the effective area of overlap. Consequently, although the effective sealing interface area between the nested spherical segments may be reduced, a continuous, positive seal is maintained completely around the spherical segment interface.

As can best be seen in FIG. 4 and FIG. 5, the convex sealing surface 52S of the flapper plate 52 engages the yieldable, auxiliary valve seat body 90 along the concave spherical segment surface 74S simultaneously as it engages the concave spherical sealing surface 76S which is formed on the primary valve seat 76. According to this arrangement, two bands of sealing interface areas are produced, one metal-to-metal between the upper sealing surface 52S of the closure plate 52 against the concave spherical surface segment 76S of the primary valve seat, and by the lower convex sealing surface 52S of the flapper plate 52 against the concave sealing surface 74S of the yieldable valve seat body 90. According to this arrangement, the body of yieldable material undergoes plastic deformation in response to the impact of the flapper plate 52, thereby compensating for angular misalignment and for surface irregularities caused by sand fines. That is, the yieldable seal body 90 deforms slightly to accommodate surface irregularities and misalignment, thereby producing a continuous, positive seal around the spherical segment interface.

Figure 6:
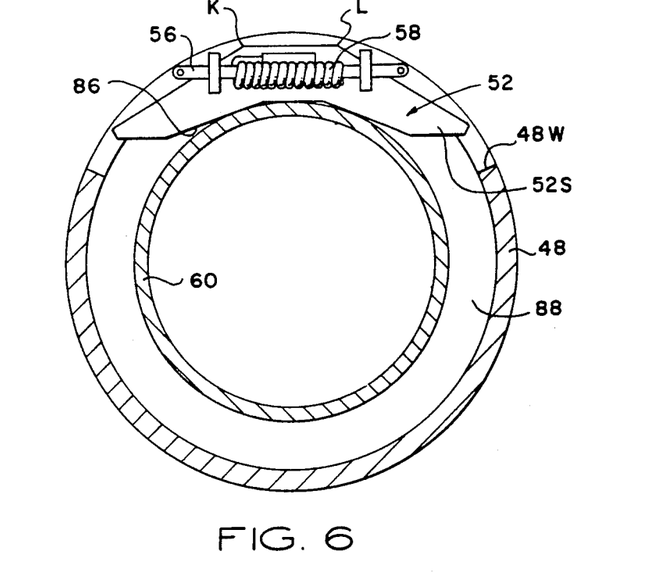
FIG. 6 is a simplified sectional view showing the position of the flapper closure plate relative to the operator tube and safety valve housing in the valve open position.
Figure 7:
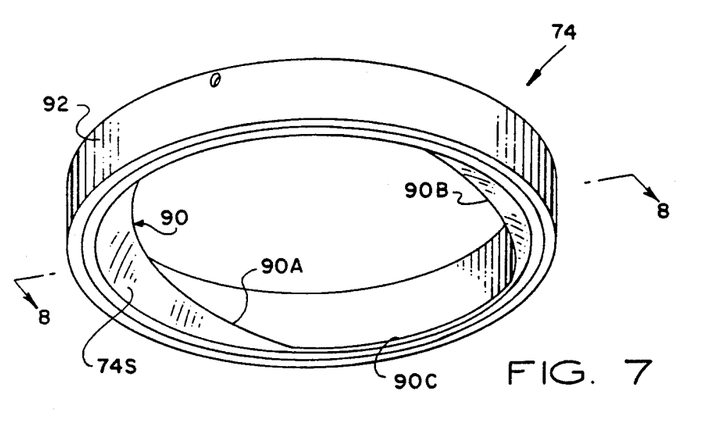
FIG. 7 is a bottom perspective view of the valve seat insert assembly of the present invention.

Referring now to FIGS. 11–15, the streamlined flapper plate 52 is constructed of a hard metal such as stainless steel and has the general configuration of a cylindrical segment which has been machined to produce the convex spherical sealing surface 52S. A shallow channel 86 is formed across the top of the flapper plate in alignment with its longitudinal axis F. The radial projection of the flapper plate 52 is minimized, so that in the open position as shown in FIG. 6, the operator tube 60 is received within the channel 86, with the convex spherical sealing segment 52S projecting into the annulus 88 between the operator tube 60 and the flapper housing sub 48 and into the window opening 48W. According to this arrangement, the flapper plate 52 can be designed and dimensioned for use in combination with a variety of safety valves having a wide range of inside diameter bores and outside diameters.

It should be noted that the convex spherical segment sealing surface 52S is not contacted by the operator tube 60 during opening or closing operation, thereby avoiding damage or distortion to the sealing surface. The operator tube 60 instead engages the top planar surface 52T and the semi-cylindrical channel 84, which prevents scraping contact against the spherical segment sealing surface 52S which lies entirely below the top surface plane of the flapper plate 52.

Referring now to FIGS. 7–10 and FIG. 4A, 5A, the valve seat insert 74 consists of an elastomer valve seat body 90 which is enclosed within a cylindrical retainer collar 92. The elastomer material 90 is a synthetic rubber-like polymer, for example nitrile rubber, having a durometer hardness in the range of 70-95 (Shore A).

Although a resilient elastomer material is preferred, other yieldable materials may be used to good advantage. For example, a thermoplastic polymer such as TEFLON® tetrafluoroethylene (TFE) fluorocarbon polymer or a soft, ductile metal such as lead, copper, zinc and brass may be used.

As used herein, the term "yieldable" refers to the ability of a material to undergo plastic deformation in response to mechanical stress. "Yield" refers to the level of mechanical stress required to cause plastic deformation in a material. The valve seat insert material 90 is yieldable relative to the flapper plate 52 material, and undergoes plastic deformation at a substantially lower stress level as compared to the flapper plate material.

The yieldable seal body 90 has two major lobes 90A, 90B and two minor lobes 90C, 90D. The major lobes present relatively large, concave spherical surfaces, and the minor lobes 90C, 90D present a relatively narrow lip which is a continuation of the major lobe spherical segment sealing surfaces.

To accommodate the angular features of the resilient seal insert 90, the top surface of the resilient seal element 90 has a complementary sloping surface for mating engagement. The mating interface provides proper orientation of the resilient seal body 90 with respect to the flapper closure plate 52. Alignment is maintained with a threaded pin P (lug or screw) which ensures that the flapper closure plate 52, the yieldable seal body 90 and the valve seat will all be oriented together. The alignment pin P passes through the flapper housing 54 and the resilient seal 90 and engages a threaded bore in the primary valve seat 76 to maintain correct orientation and alignment (FIG. 5).

TUBING RETRIEVABLE EMBODIMENT

While the streamlined flapper plate 52 and valve seat insert 74 have been described in combination with a wire line retrievable subsurface safety valve, it will be understood that the streamlined flapper valve assembly of the present invention can be used equally well in combination with a tubing retrievable subsurface safety valve. The tubing retrievable safety valve has a relatively larger production bore, and is therefore well adapted for use in high flow rate wells. Operation of the tubing retrievable safety valve assembly 110 shown in FIGS. 16, 17, 18, and 19 is substantially the same as the wire line retrievable safety valve assembly 10 of FIG. 2, with the exception that the safety valve assembly 110 is connected directly in series with the production tubing 12, and hydraulic control pressure is conducted through a longitudinal bore 112 formed in the sidewall of the top connector sub 44. Operation of the tubing retrievable subsurface safety valve having a streamlined flapper valve plate of the present invention is otherwise identical in all respects with the operation of the surface controllable, wire line retrievable safety valve embodiment.

Referring now to FIGS. 16, 17, 18, and 19, a tubing retrievable subsurface safety valve 110 is illustrated. The tubing retrievable safety valve 110 has a relatively larger production bore, and is therefore intended for use in high flow rate wells.

Operation of the tubing retrievable safety valve assembly 110 is substantially the same as the wire line retrievable embodiment shown in FIGS. 1,2 with the exception that the safety valve assembly 110 is connected directly in series with the production tubing 12. Hydraulic control pressure is conducted through the conduit 26 which is connected in communication with a longitudinal bore 112 formed in the sidewall of the top connector sub 44. Pressurized hydraulic fluid is delivered through the longitudinal bore 112 into an annular chamber 114 defined by a counterbore 116 which is in communication with a annular undercut 118 formed in the sidewall of the top connector sub 44. An inner housing mandrel 120 is slidably coupled and sealed to the top sub 44 by a slip union U and seal S, with the undercut 118 defining an annulus between the inner mandrel and the sidewall of top connector sub 44.

The piston 62 is received in slidable, sealed engagement against the internal bore of a lock out housing (inner mandrel) 120. The undercut annulus 118 opens into a piston chamber 122 in the annulus between the internal bore of a connector sub 124 and the external surface of the piston 62. The external radius of an upper sidewall piston section 62C is machined and reduced to define a radial clearance between the piston and the connector sub 124. An annular sloping surface 62D of the piston is acted against by the pressurized hydraulic fluid delivered through control conduit 26. In FIGS. 16 and 17, the piston 62 is fully extended with the piston shoulder 66 engaging the top annular face 60A of the operator tube 60. In the valve open position, the return spring 68 is fully compressed.

The flapper plate 52 is pivotally mounted onto the hinge sub 54 which is connected to the lower end of spring housing 64 by a threaded connection T. The valve seat insert 74 is confined within the counterbore 76 by the radially stepped shoulder 80 formed on the hinge sub 54. The lower end of the safety valve 110 is connected to the production tubing 12 by a bottom sub connector 130. The bottom sub connector 130 has a counterbore 132 which defines a flapper valve chamber 134. Thus the bottom sub connector 130 forms a part of the flapper valve housing enclosure.

The flapper closure plate 52 is truncated bilaterally and symmetrically on opposite sides of its longitudinal axis F (FIGS. 12, 15) along sloping side panels 52A, 52B to avoid contact with the inside diameter bore of the flapper housing sub. The body of the flapper plate 52 is also truncated along a bottom surface 52W which slopes inwardly with respect to the rear surface 52R. Moreover, the top surface 52T of the flapper plate 52 nearest the hinge 52H and its rear (bottom) surface 52R are dimensioned such that the two outside edges K, L (FIG. 13) will contact the bottom sub bore 132 before it is contacted by the outside edge of the convex sealing surface 52S.

That is, if in response to a forceful opening thrust applied by the operator tube 60 against the top surface 52T of the flapper plate 52, the flapper plate is driven counterclockwise into engagement with the bottom housing sub 130, the flapper plate will strike the bottom sub housing against its rear edges K, L where the flapper plate is the thickest, rather than along the peripheral edge 52S where it is thinnest and most susceptible to warping or distortion.

Operation of the tubing retrievable subsurface safety valve 110 is otherwise identical in all respects with the operation of the surface controllable, wire line retrievable safety valve embodiment 10 as illustrated in FIGS. 1,2.

Although the invention has been described in part by making detailed reference to specific embodiments, such detail is intended to be and will be understood to be instructional rather than restrictive. It will be appreciated by those skilled in the art that variations may be made in the structure and mode of operation without departing from the spirit and scope of the invention as disclosed herein.

What is claimed is:

1. In a tubing retrievable subsurface safety valve of the type having a tubular housing adapted for connection in a production tubing string and having a chamber formed therein, a valve body disposed within said housing chamber having a production flow passage, and a valve closure assembly disposed within said housing chamber, said valve closure assembly including a flapper plate for opening and closing said production flow passage, said valve body being characterized by a first concave spherical segment of metal and a second concave spherical segment of yieldable material, said first and second spherical segments being disposed in concave spherical surface alignment with each other and in combination define a concave, spherical segment valve seat surface about said production flow passage, and said flapper plate being characterized by a convex spherical segment defining a convex spherical sealing surface for mating engagement with said concave spherical segment valve seat.

2. The subsurface safety valve improvement as defined in claim 1, wherein said yieldable material is an elastomeric polymer material.

3. The subsurface safety valve improvement as defined in claim 2, wherein the elastomeric polymer material is nitrile rubber having a durometer hardness in the range of 70-95 (Shore A).

4. The subsurface safety valve improvement as defined in claim 1, wherein said yieldable material is a thermoplastic polymer material.

5. The subsurface safety valve improvement as defined in claim 4, wherein the thermoplastic polymer material is tetrafluoroethylene (TFE) fluorocarbon polymer.

6. The improved subsurface safety valve as defined in claim 1, wherein the yieldable material is a soft metal selected from the group consisting of lead, copper, zinc and brass.

7. In a wire line retrievable subsurface safety valve of the type having a tubular housing adapted for releasable engagement against the bore of a landing nipple and having a chamber formed therein, a valve body disposed within said housing chamber having a production flow passage, and a valve closure assembly disposed within said housing chamber, said valve closure assembly including a flapper plate for opening and closing said production flow passage, said valve body being characterized by a first concave spherical segment of metal and a second concave spherical segment of relatively yieldable material, said first and second spherical segments being disposed in concave spherical surface alignment with each other and in combination define a concave, spherical segment valve seat surface about said production flow passage, and said flapper plate being characterized by a convex spherical segment defining a convex spherical segment sealing surface for mating engagement with said concave, spherical segment valve seat surface.

8. The subsurface safety valve improvement as defined in claim 7, wherein said yieldable material is an elastomeric polymer material.

9. The subsurface safety valve improvement as defined in claim 8, wherein the elastomeric polymer material is nitrile rubber having a durometer hardness in the range of 70-95 (Shore A).

10. The subsurface safety valve improvement as defined in claim 7, wherein said yieldable material is a thermoplastic polymer material.

11. The subsurface safety valve improvement as defined in claim 10, wherein the thermoplastic polymer material is tetrafluoroethylene (TFE) fluorocarbon polymer.

12. The improved subsurface safety valve as defined in claim 7, wherein the yieldable material is a soft metal selected from the group consisting of lead, copper, zinc and brass.

13. A flapper valve assembly comprising, in combination:

a tubular valve housing sub having a valve chamber;

a valve body mounted on said housing sub having a flow passage therethrough in communication with said valve chamber, said valve body having a valve seat sealing surface of metal substantially in the form of a concave spherical segment and a valve seat insert of relatively yieldable material substantially in the form of a concave spherical segment, said spherical segments being disposed in concave spherical surface alignment with each other about said valve body flow passage; and, a flapper plate disposed in said valve chamber for rotatable movement from a valve open position in which said flapper plate is removed from said valve seat to a valve closed position in which said flapper plate extends transversely across said flow passage in sealing engagement with said valve seat sealing surface for preventing flow through said flow passage, said flapper plate having a sealing surface substantially in the form of a convex spherical segment for sealing engagement against said concave spherical segment valve seat.

14. A flapper valve assembly as defined in claim 13, wherein the radius of curvature of the concave spherical metal valve seat segment and the radius of curvature of the yieldable, concave spherical valve seat segment are matched with the radius of curvature of the convex spherical flapper plate segment to permit nesting engagement of the convex sealing surface of said flapper plate against the concave sealing surface of said valve seat when said flapper plate is in the valve closed position.

15. A subsurface safety valve adapted to be placed in a well tubing string to control flow therethrough comprising, in combination:
a valve housing having a bore therethrough;
a valve closure member mounted in said housing bore and movable between an open bore position and a closed bore position;
an operator tube movably disposed within said housing bore for controlling movement of the valve closure member;
a tubular piston movably mounted on said valve housing for longitudinal extension and retraction, and piston being coupled to said operator tube for extending said operator tube relative to said valve closure member;
a valve body disposed within said valve housing, said valve body having a flow passage bore and being characterized by a first annular segment of metal and a second annular segment of yieldable material, said first and second annular segments each having concave spherical sealing surfaces disposed in concave spherical alignment with each other, and defining an annular valve seat about said flow passage bore; and,
said valve closure member having a convex spherical segment defining an annular sealing surface for engaging said valve seat.

16. A subsurface safety valve as defined in claim 15, wherein the convex and concave spherical sealing surfaces are matched to permit smooth, non-binding angular displacement of the valve closure member relative to the valve seat concave sealing surface when the valve closure member is in the closed bore position.

17. A subsurface safety valve as defined in claim 15, wherein the radius of curvature of the convex closure member spherical segment is matched with the radius of curvature of the concave valve seat spherical segment to permit nesting engagement of the convex sealing surface of said closure member against said concave spherical valve seat.

18. In a surface controllable subsurface safety valve of the type having a tubular housing and a chamber formed therein, a piston and operator tube mounted for extension through said housing chamber in response to application of hydraulic control pressure onto said piston, a return spring interposed between said housing and said piston for retracting said piston and operator tube in response to the removal of hydraulic control pressure from said piston, a valve body disposed within said housing chamber having a production flow passage, and a valve closure assembly disposed within said housing chamber, said valve closure assembly including a flapper plate for opening and closing said production flow passage in response to extension and retraction of said operator tube, said valve body being characterized by a first concave spherical segment of metal and a second concave spherical segment of yieldable material, said first and second spherical segments having concave spherical surfaces, respectively, disposed in surface alignment with each other and in combination define a concave, spherical segment valve seat surface about said production flow passage, and said flapper plate having a convex spherical segment surface defining a sealing surface for engaging the concave valve seat surface on said valve body.

19. The subsurface safety valve improvement as defined in claim 18, wherein said yieldable material is an elastomeric polymer material.

20. The subsurface safety valve improvement as defined in claim 19, wherein the elastomeric polymer material is nitrile rubber having a durometer hardness in the range of 70–95 (Shore A).

21. The subsurface safety valve improvement as defined in claim 19, wherein said yieldable material is a thermoplastic polymer material.

22. The subsurface safety valve improvement as defined in claim 21, wherein the thermoplastic polymer material is tetrafluoroethylene (TFE) fluorocarbon polymer.

23. The improved subsurface safety valve as defined in claim 19, wherein the yieldable material is a soft metal selected from the group consisting of lead, copper, zinc and brass.

24. A flapper valve assembly comprising, in combination:
a tubular valve seat body having a bore defining a fluid flow passage and having a primary valve seat sealing surface of metal substantially in the form of a concave spherical segment disposed about the fluid flow passage;
a tubular hinge sub having a bore defining a valve closure chamber and having a counterbore defining an insert chamber, said hinge sub being attached to said tubular valve seat body with said valve seat body having an annular seat portion radially spaced from said hinge sub;
a valve seat insert having an insert body portion disposed in the insert chamber intermediate said hinge sub and valve seat body, said valve seat insert having an auxiliary sealing surface in the form of a concave spherical segment of relatively yieldable material disposed in spherical surface alignment with said primary valve seat sealing surface;
a valve closure plate pivotally mounted on said hinge sub for preventing flow through said fluid flow passage when said closure plate is engaged against said annular seating surface; and,
said valve closure plate having an annular sealing surface substantially in the form of a convex spherical segment for engaging the primary and auxiliary concave valve seat sealing surfaces on said valve seat body.

25. A flapper valve assembly as defined in claim 24, including an alignment pin projecting radially through said valve seat body, said valve seat insert and said hinge sub.

* * * * *